United States Patent [19]

Maruko et al.

[11] 4,362,931
[45] Dec. 7, 1982

[54] SUN FOLLOWING-UP DEVICE FOR SOLAR HEAT UTILIZATION APPARATUS

[76] Inventors: Saburo Maruko, Yamato; Kenji Yamada, Matsudo, both of Japan

[21] Appl. No.: 213,120

[22] Filed: Dec. 4, 1980

[30] Foreign Application Priority Data

Dec. 7, 1979 [JP] Japan ............................. 54/158183

[51] Int. Cl.³ ............................................. G01J 1/20
[52] U.S. Cl. ................................. 250/203 R; 126/425
[58] Field of Search .......................... 250/203 R, 209; 126/425

[56] References Cited

U.S. PATENT DOCUMENTS 3,917,942 11/1975 McCay .......................... 250/203 R
4,287,411 9/1981 Beucci ........................... 250/203 R
4,324,225 4/1982 Trihey ............................. 126/425

Primary Examiner—David C. Nelms
Attorney, Agent, or Firm—Armstrong, Nikaido, Marmelstein & Kubovcik

[57] ABSTRACT

A sun following-up device for a solar heat utilization apparatus which comprises a hollow cylindrical member, a fish eye lens unit on the top of said cylindrical member, a series of vertically spaced lenses positioned within said cylindrical member, a casing positioned on the bottom of said cylindrical member, a screen glass positioned within said casing for forming an image thereon, a pair of spaced diffusion glasses positioned on the undersurface of said screen glass to define a slit between the opposing faces thereof, a pair of photosensitive cells positioned on the undersurface of said diffusion glasses, optical fibers having one ends received in said slit leaving a clearance between the ends and a pair of photosensitive cells secured to said optical fibers.

2 Claims, 7 Drawing Figures

FIG_6
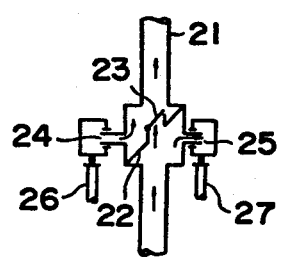
FIG_7
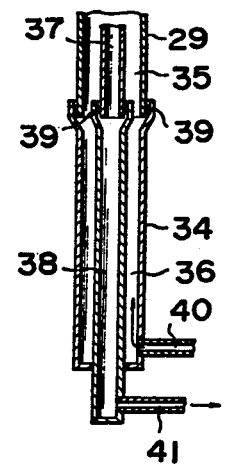

SUN FOLLOWING-UP DEVICE FOR SOLAR HEAT UTILIZATION APPARATUS

BACKGROUND OF THE INVENTION

This invention relates to a sun following-up device for use with a solar heat utilization apparatus which is adapted to focus the received sunlight and utilize the focused sunlight as heat energy for heating and cooling purposes.

In order to utilize the sunlight as heat energy for heating and cooling purposes, various researches have been made and being made. The applicant has developed a solar heat utilization apparatus which is adapted to condense the received sunlight and then convert the condensed sunlight into heat energy, which utilizes a light to energy conversion device having a small area and which can be produced at less expense. The solar heat utilization apparatus is disclosed in U.S. patent application Ser. No. 119,882, now U.S. Pat. No. 4,317,444 Australian Patent Application No. 55449/80 and European Patent Application No. 80100951.5 filed in the name of the same applicant.

The solar heat utilization apparatus referred to above is a so-called sunlight reflection apparatus of the two shaft sunlight following-up type and one of the most important requirements called for the apparatus is that the focused sunlight properly strikes on the heat collecting means which is provided at the focus of the parabolic trough of the sunlight reflector. For the purpose, the higher the condensing degree is and the greater the center angle connecting between the focus and the peripheral edge of the sunlight reflector is, the higher the preciseness required for the angular deviation between the sunlight axis and the optical axis of the parabolic trough reflector should be.

As one example, when the center angle of the sunlight reflector is 213°, the angular deviation is ±1°5' for the sunlight condensing magnification of 27 times and ±33' for the sunlight condensing magnification of 54 times.

The angle of the vertical rotary shaft is especially required to be precise and as to the angle of the horizontal rotary shafts, even if the angle is not highly precise, a slight deviation of the angle of the horizontal rotary shafts will not present any serious problem if the length of the heat collecting means is extended by a small amount.

As the size of the sunlight reflector increases, it is required that the optical axis of the reflector is reorientated vertically so as to minimize the area of the reflector parabolic trough which faces the wind to avoid the influence of the wind force, the reflector is allowed to rotate freely under the force of the wind and the reflector is returned to the normal position when the wind velocity decreases. And it is also required that the reflector returns automatically to the normal position from the position which the reflector assumed at the time of interruption of electric current supply or at night.

SUMMARY OF THE INVENTION

I have exerted my utmost efforts to develop a sun following-up device which can satisfy the above-mentioned requirements and which can be produced at less expense and have reached the present invention which will be described hereinafter.

One aspect of the present invention is to provide a sun following-up device for a solar heat utilization apparatus having a sunlight reflector, a pair of horizontal rotary shafts and a vertical rotary shaft which comprises a fish eye lens unit having the optical axis parallel to the optical axis of the reflector, a series of spaced lenses disposed below the fish eye lens unit, a screen glass positioned below the series of lenses for forming an image thereon, two spaced diffusion glasses provided on the undersurface of the screen glass with a slit defined therebetween, two photosensitive cells provided on the under surface of the diffusion glasses as sensors for the vertical rotary shaft, optical fibers having one ends received in the slit so as to leave a clearance between the ends and two photosensitive cells secured to the other ends of the optical fibers as sensors for the horizontal rotary shafts, whereby the sensors control the drive means for the vertical and horizontal rotary shafts so as to always align the optical axis of the reflector with the sunlight axis.

Another aspect of the present invention is to provide a sun following-up device for a solar heat utilization apparatus in which when the time period during which the quantity of the sunlight is less than a predetermined value is longer than a predetermined time period and/or the wind velocity is in excess of a predetermined value, the optical axis of the reflector is orientated vertical and the reflector is maintained in the position in which the optical axis is orientated vertically for a predetermined time period after the orientation of the optical axis to the vertical.

The above and other objects of the present invention will be more readily apparent to those skilled in the art from a reading of the following detailed description in conjunction with the accompanying drawings which show one preferred embodiment of the invention for illustration purpose only, but not for limitation the scope of the same in any way.

BRIEF DESCRIPTION OF THE DRAWINGS

FIG. 6 is an elevational view of the mechanism for prevention of cold liquid discharge in the solar heat utilization apparatus; and FIG. 7 is a vertically sectional view showing the relationship between the double shaft and stationary double shaft.

PREFERRED EMBODIMENT OF THE INVENTION

Figure 1:
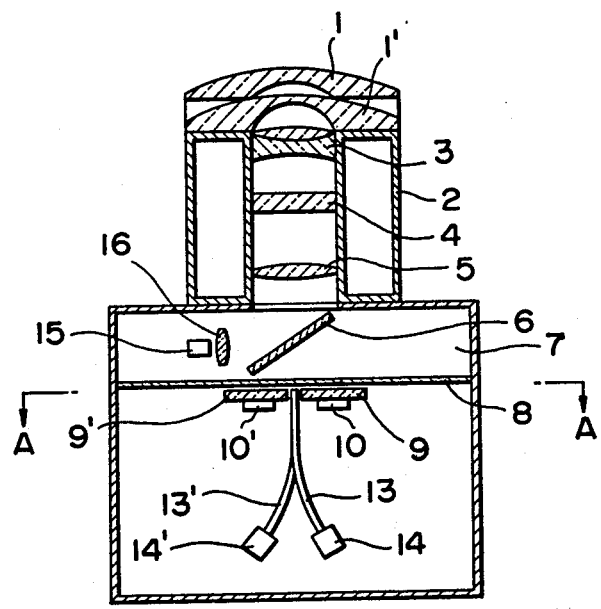
FIG. 1 is a schematic elevational view in partial section of the sun following-up device of the present invention.

Before description is made on the sun following-up device of the present invention, the solar heat utilization apparatus which is disclosed in the above-mentioned U.S., Australian and European patent applications and in which the sun following-up device is incorporated will be in brief described referring to FIGS. 4 to 7 inclusive of the accompanying drawings. The solar heat utilization apparatus generally comprises a sunlight reflector having the parabolic trough, a hollow vertical rotary shaft extending vertically through the center of the reflector, a pair of horizontal rotary shafts rotatably supporting the reflector, a heat collecting means provided at the focus of the parabolic trough of the sunlight reflector and a liquid recycle pipe connected to and extending in parallel to the heat collecting means. The recycle pipe has an inlet tube and an outlet tube for liquid to be heated provided on the opposite sides of the recycle pipe in coaxial relationship to the horizontal rotary shafts.

The solar heat utilization apparatus will be in detail described referring to FIGS. 4 to 7 inclusive. The sunlight reflector 17 is provided by a pair of metal plates 19, 19' secured to a grid structure framework 18 which is concaved on the upper surface so as to form the parabolic trough of the sunlight reflector 17 and the heat collecting means 20 is provided at the focus of the reflector. The liquid recycle pipe 21 is connected to and in communication with the heat collecting means 20 and liquid to be heated flows from the recycle pipe 21 into the heat collecting means 20 where the liquid is heated with the heat from the sunlight and the heated liquid flows from the heat collecting means 20 back into the recycle pipe 21. Provided in an intermediate section between the opposite ends of the liquid recycle pipe 21 is a mechanism for prevention of cold liquid discharge which comprises a partition plate or buffer 22 and a check valve 23 (see FIG. 6). An inlet tube 24 and an outlet tube 25 for liquid to be heated are provided on the opposite sides of the pipe 21 in parallel to and communication with the pipe 21. The inlet tube 24 has a liquid supply tube 26 connected thereto and the outlet tube 25 has a liquid discharge tube 27 connected thereto, respectively. The supply tube 26 and discharge tube 27 are connected to a common double tube 29 which is in turn coaxially disposed within the hollow vertical rotary shaft 28 for rotation together with the latter.

A pair of opposite shaft support members 31, 31 are provided in diametrically opposite positions of the framework 18 to rotatably support the inner ends of a pair of horizontal rotary stub shafts 30, 30 and the other or outer ends of the stub shafts are journalled in bearings 33, 33 which are in turn suitably supported by the free ends of the opposite legs of a U-shaped frame member 32 secured to the vertical hollow shaft 28. The horizontal rotary stub shafts 30 are disposed coaxial or substantially coaxial with the liquid inlet and outlet tubes 24, 25.

The double tube 29 is connected at the lower end to a hollow stationary shaft 34 which is also in the form of a double tube. The outer tube 35 of the double tube 29 is in communication with the outer tube 36 of the stationary shaft 34 to provide a supply passage for liquid to be heated. Similarly, the inner tube 37 of the double tube 29 is in communication with the inner tube 38 of the stationary shaft 34 to provide a discharge passage for the liquid after the liquid has been heated. In the illustrated solar heat utilization apparatus, the sealing between the outer tubes 35, 36 of the double tube and stationary shaft 29, 34 and between the inner tubes 37, 38 of the double tube and stationary shaft, respectively, is not required to be closely tight, but may be just sufficient to prevent leakage of the liquid to the exterior of the system. In the illustrated solar heat utilization apparatus, the sealing between the double tube 29 and stationary shaft 34 is effected by the employment of O-rings 39.

The outer tube 36 of the stationary shaft 34 is connected at the lower end to a supply tube 40 for liquid to be heated and the inner tube 38 of the stationary shaft is connected at the lower end to a discharge tube 41 for heated liquid, respectively. The liquid from the supply tube 40 associated with the stationary shaft 34 passes through the supply passage defined by the outer tubes 35, 36 of the double tube 29 and stationary shaft 34 to and through the supply tube 29 of the recycle pipe 21 connected to the outer tube 35 of the double tube 29. The heated liquid discharged from the recycle pipe 21 flows through the discharge tube 27 into the discharge passage defined by the inner tubes 37, 38 of the double tube 29 and stationary shaft 34 and then into the discharge tube 41 associated with the inner tube 38 of the stationary shaft to be discharged out of the system.

Figure 4:
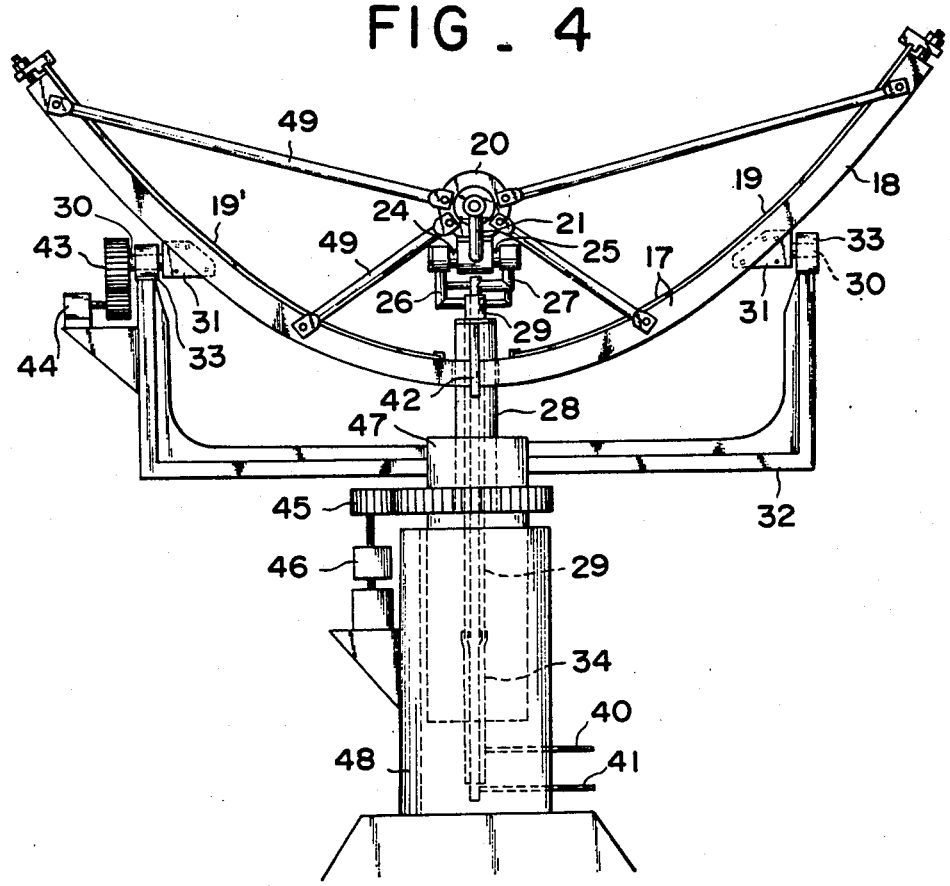
FIG. 4 is a side elevational view of a solar heat utilization apparatus in which the sun following-up device of the invention is incorporated.
Figure 5:
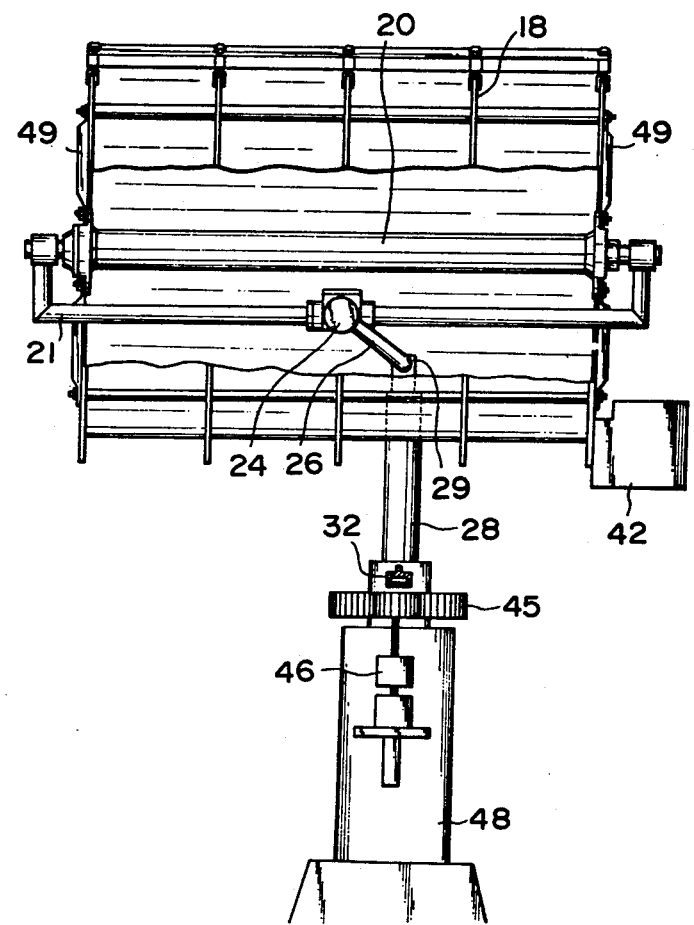
FIG. 5 is a front elevational view of the solar heat utilization apparatus as shown in FIG. 4.

A rudder 42 is attached to the framework 18 and a gear 43 is mounted at the outer end of one of the horizontal rotary shaft 30 (the left-hand shaft as seen in FIG. 4) which is operatively connected to a drive means such as a motor for driving the particular stub shaft 30. A gear is mounted on a pipe 47 secured to the vertical rotary shaft 28 and meshes a smaller diameter gear 45 which is in turn operatively connected to a drive means 46 such as a clutch type drive means for rotating the vertical rotary shaft 28. The drive means 46 is mounted on a pedestal 48 which is held in position on a suitable support base such as a floor. Reference numeral 49 denotes support rods extending between and secured at the opposite ends to the heat collecting means 11 and framework 18.

Now referring to FIGS. 1 to 3 inclusive which show the preferred embodiment of sun following-up device of the present invention which is to be incorporated in the solar heat utilization apparatus referred to hereinabove. The sun following-up device is positioned between one of the shorter support rods 49 and the double tube 29 in coaxial relationship to the optical axis of the reflector 17 and adapted to follow up the moving sun. The sun following-up device will be now in detail described referring to FIGS. 1 to 3 inclusive.

Figure 2:
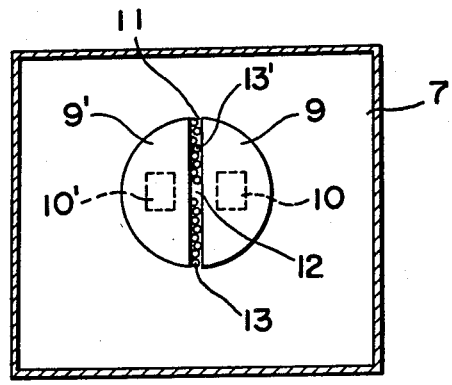
FIG. 2 is a schematic cross-sectional view taken substantially along the line A—A of FIG. 1.

In FIG. 1, reference numerals 1 and 1' denote fish eye lenses laid one upon another on the top of a hollow cylindrical member 2 and having the field of view of 180° which covers the entire incidence angle of the sunlight when the optical axis of the sunlight reflector 17 is disposed vertically. Since the optical axis of the sunlight reflector 17 is disposed vertically at the time of sunrise on a day, the incoming light is refracted by the fish eye lenses 1, 1' reaches a condensing lens 3 positioned right below the lower concavo-convex lens 1' within the cylindrical member 2. The light is further refracted by the condensing lens 3 and passes through a filter 4 positioned below and spaced from the focusing lens 3 within the cylindrical member 2 to adjust the intensity of the light. After the intensity adjustment, the light passes through an image formation adjusting lens 5 positioned below and spaced from the filter 4 within the cylindrical member 2 and then through a semi-transmissive glass 6 provided at the lower end edge of the cylindrical member 2 to a screen glass 8 provided within a casing 7 positioned under the cylindrical member 2 and forms an image on the screen glass 8.

Diffusion glasses 9, 9' are provided on the undersurface of the screen glass 8 in the center thereof in opposed and spaced relationship to provide a clearance or slit 11 between the opposing faces of the glasses 9, 9' for the purpose to be described hereinafter. Having passed through the screen glass 8, the light is diffused by either the diffusion glass 9 or 9' and strikes on either one of photosensitive cells 10 and 10' provided on the undersurface of the diffusion glasses 9, 9', respectively. The periphery of the diffusion glasses 9, 9' is preferably coated with a reflective material which reflects the light into the interior of the diffusion glasses. Since the photosensitive cell 10 or 10' senses the light regardless of the position of the area of the associated diffusion glass 9 or 9' where the light strikes, the size of the photosensitive cells 10, 10' is not required to be large sufficient to cover the entire image forming area and the photosensitive cells 10, 10' may be of small size. Furthermore, each of the photosensitive cells may be formed by a single element.

The photosensitive cell 10 is designed to operate a switch which is adapted to rotate the vertical rotary shaft 28 in the clockwise direction as seen from above in FIG. 4 whereas the photosensitive cell 10' is adapted to operate a switch which is adapted to rotate the vertical rotary shaft 28 in the counter-clockwise direction as seen from above in FIG. 4. The width of the slit 11 defined between the diffusion glasses 9, 9' is of such an extent that the angular deviation of the optical axis of the reflector 17 with respect to the optical axis of the sunlight can be maintained within a suitable range ($\pm 1°$, for example) and thus, the control electric circuit is so arranged that so long as the formed image is positioned within the slit 11, the vertical rotary shaft 28 remains stationary and on the other hand, if and when the formed image displaces from the slit 11, the photosensitive cell 10 or 10' senses such displacement and rotates the motor for the rotary shaft 28 whereby the formed image always enters the slit 11 and remains there. The motor ceases its rotation with the angular deviation of the optical axis of the reflector 17 with respect to the optical axis of the sunlight maintained within the suitable range ($\pm 1°$, for example). Thus, the solar heat utilization apparatus also ceases its rotation.

Since the intensity of the sunlight on the image forming surface of the screen glass 8 varies depending upon the magnitude of the angular deviation of the optical axis of the reflector with respect to that of the sunlight, it is desirable to design the filter 4 so that the light amount is increased in the central area of the filter and decreased in the peripheral area thereof whereby the intensity of illumination of the image formed on the screen glass 8 is made substantially the same throughout the image.

In connection with the rotation of the horizontal rotary stub shafts 30, one ends of the optical fibers 13, 13' are inserted in the slit 11 so as to leave a clearance 12 which may be a suitable shape such as square or circular between the ends of the optical fibers 13, 13' and the other ends of the optical fibers have photosensitive cells 14, 14' secured thereto, respectively. When the formed image is positioned on the photosensitive cell 14, the motor 44 is actuated to rotate the horizontal shafts 30 so as to increase the angle of elevation of the reflector optical axis. On the other hand, when the formed image is positioned on the photo cell 14', the motor 44 is actuated so as to decrease the angle of elevation of the reflector optical axis. When the formed image moves from the photosensitive cell 14 or 14' to the clearance 12, the rotation of the motor 44 is terminated. Since the formed image remains within the slit 11 at this time, the vertical rotary shaft 28 remains stationary. In FIG. 1, reference numeral 15 denotes a light quantity detection photosensitive sensor and reference numeral 16 denotes a condensing lens.

Figure 3:
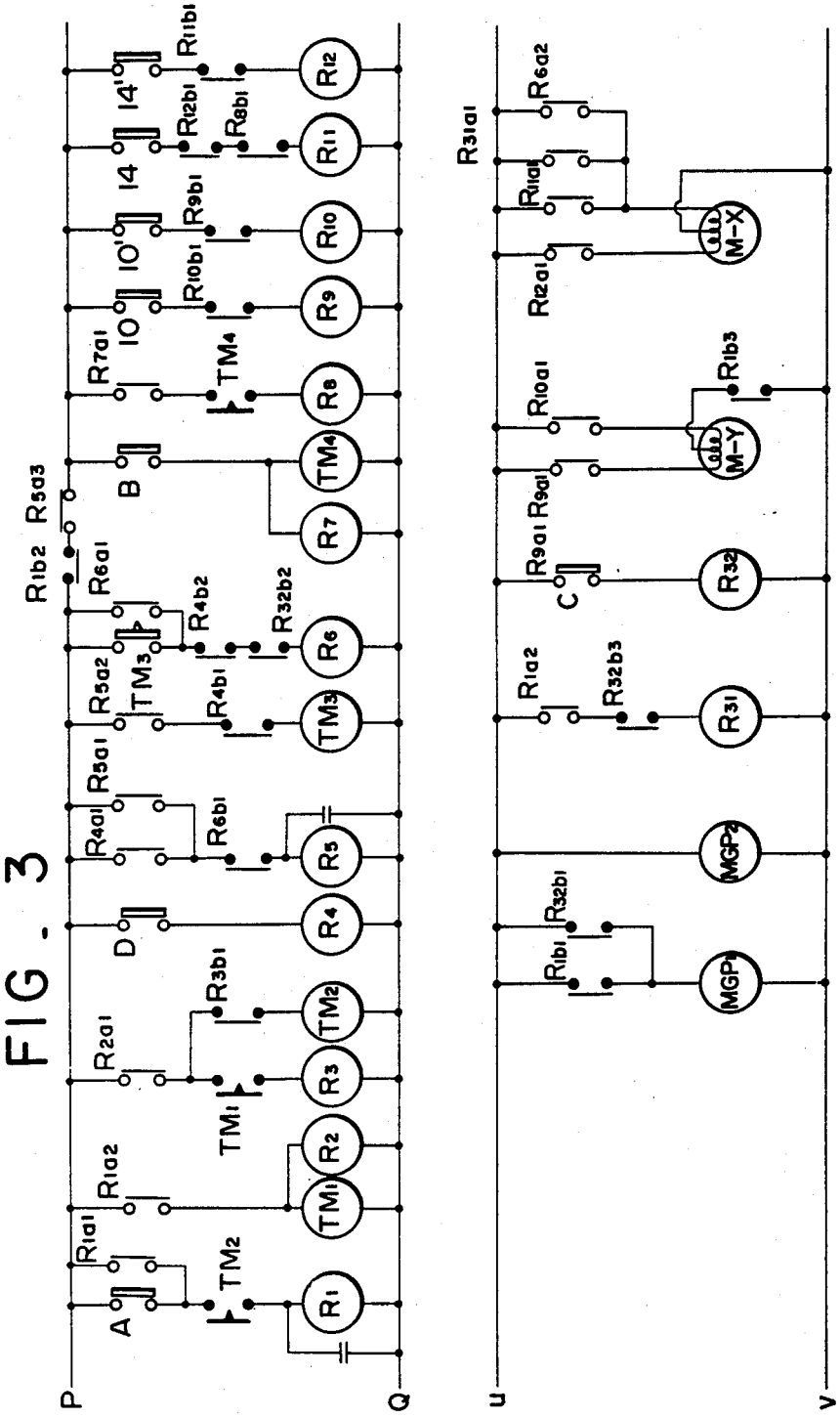
FIG. 3 is a diagram of the control sequence of the system.

FIG. 3 is a diagram showing the control sequence of the system and in FIG. 3, with the lines P and Q applied a DC voltage thereto and the lines u and v applied an AC voltage thereto, when the photosensitive sensor D (corresponding to the photosensitive sensor 15 in FIG. 1) is actuated, the relay $R_4$ operates momentarily and the relay $R_5$ then operates and maintains the operation condition. At this time, the relay $R_{5a3}$ turns the control circuit for the vertical rotary shaft drive motor M-Y and horizontal rotary shaft drive motor M-X on, and the control circuit comprises the relays $R_7$–$R_{12}$ and timer $TM_4$. The circuit of the photosensitive cell 10 comprises the relay $R_9$ and the circuit of the photosensitive cell 10' comprises the relay $R_{10}$. These circuits of the photosensitive cells are interlocked at the contact b. The circuit of the photosensitive cell 14 comprises the relay $R_{11}$ and the circuit of the photosensitive cell 14' comprises the relay $R_{12}$. These circuits of the photosensitive cells 14, 14' are similarly interlocked at the contact b. When the photosensitive sensor D is turned off when the sun sets or hides itself behind the cloud, for example, the timer $TM_3$ initiates the operation. If the photosensitive sensor D turns on before the time set for the timer $TM_3$ elapses when the cloud rolls by, for example, the timer $TM_3$ is reset. When the time set for the timer $TM_3$ elapses, the relay $R_6$ is operated and maintains the operative condition and the relay $R_5$ is reset. Thus, the horizontal rotary shaft drive motor M-X rotates in the forward direction to increase the angle of elevation of the reflector until the angle becomes the vertical whereupon the sensor C which is adapted to detect the angle of elevation is operated to set the relay $R_6$.

Next, description will be made of events which occur when the wind force sensor A operates. When the wind force sensor A operates, the relay $R_1$ is operated and maintains the operative condition and the timer $TM_1$, relay $R_2$, relay $R_3$ and relay $R_{31}$ operate. In the same manner as when the light sensor D turns off, the relays $R_{31a1}$ rotates the horizontal rotary shaft drive motor M-X in the forward direction so as to increase the angle of elevation of the reflector until the angle of elevation becomes the vertical whereupon the angle of elevation detection sensor C operates (the sensor C has been already operated and maintains the operative condition during the night hours and the sun is hiding itself behind the cloud). Therefore, the magnet plunger $MGP_1$ for the vertical rotary shaft clutch is unclutched by the AND circuit of the relays $R_{32}$ and $R_1$ and the vertical rotary shaft is mechanically released. The relays $R_{1b2}$ and $R_{1b3}$ are interlocked for the sake of safety and the relay $R_3$ and timer $TM_2$ are for the circuit resetting.

When supply of electric current is interrupted, the magnet plunger $MGP_1$ for the vertical rotary shaft clutch is unclutched and at the same time, the magnet plunger $MGP_2$ for the horizontal rotary shaft clutch is also unclutched to cope with high wind under electric current supply interruption condition.

Furthermore, when the magnet plunger $MGP_1$ for the vertical rotary shaft clutch is unclutched under the force of high wind and the reflector remains in a position deviated by 180° with respect to the optical axis of the sunlight at the time when the operator intends to return the reflector to its normal position, though such deviation occurs quite rarely the horizontal rotary shaft drive motor M-X may rotate in the reverse direction. In order to prevent such rotation of the motor M-X, a reverse direction rotation prevention circuit is provided and the circuit comprises a limit switch B for controlling the angle of elevation of the reflector, a relay $R_7$, a relay $R_8$ and a timer $TM_4$.

With the above-mentioned construction and arrangement of the components of the sun following-up device of the present invention, when the initial position of the optical axis of the reflector is assumed as being the vertical, the reflector can always follow up the moving sun. However, when the cloud rolls by after the sun has hidden itself behind the cloud for a long time period, the sunlight may shine on the back of the reflector or both the vertical and horizontal rotary shafts may not operate properly. Under high wind wheather conditions over such as 10 m/sec., the optical axis of the reflector is maintained vertical and the vertical rotary shaft is left to rotate freely so as to present a minimum area of the reflector in the direction of the wind to thereby allow the reflector to rotate freely and thus, when the velocity of the wind drops to a value below 10 m/sec., the reflector may assume an unexpected orientation with respect to the optical axis of the sunlight. Keeping this in mind, in order that the single sun following-up device can cope with various different weather conditions, according to the present invention, when the time period during which the light quantity is less than a predetermined value because the sun sets and hides itself behind the cloud extends a predetermined time length such as over 30 minutes and/or the wind velocity exceeds a predetermined value such as 10 m/sec., for example, the horizontal rotary shafts are rotated so as to orientate the optical axis of the reflector vertically and only when the wind velocity exceeds the predetermined value referred to above, the electromagnet clutch for the vertical rotary shaft is disengaged to allow the shaft to rotate freely. The optical axis of the reflector is maintained vertical by holding the reflector in position by the use of a suitable means such as a spring.

When the reflector ceases to move with the optical axis of the reflector deviated by 180° with respect to the optical axis of the sunlight as the wind velocity decreases, the vertical rotary shaft rotates in the direction opposite to the angle of elevation of the sun. In order to prevent such rotation of the vertical rotary shaft, limit switches are provided on the framework in a position slightly beyond the vertical of the optical axis of the reflector and in a position at the angle of about 5° beyond the horizon of the reflector optical axis, respectively. When these limit switches are so designed that when the switches operate, the rotation of the horizontal rotary shafts is interrupted for a predetermined time period such as over five minutes, an image is formed in the sensor associated with the vertical rotary shaft to return the optical axis of the reflector to the normal orientation whereby the horizontal rotary shafts rotate in the proper direction.

While only one embodiment of the invention has been shown and described, it will be understood that the same is for illustration purpose only and not to be taken as a definition of the invention, reference being had for this purpose to the appended claims.

What is claimed is:

1. A sun following-up device for a solar heat utilization apparatus having a framework, a sunlight reflector rotatably supported on said framework, a pair of horizontal rotary shafts rotatably supporting said reflector on said framework and a vertical rotary shaft extending through the center of said reflector, said sun following-up device comprising a fish eye lens unit having the optical axis parallel to the optical axis of said reflector, a series of vertically spaced lenses positioned below said fish eye lens unit, a screen glass positioned below said series of spaced lenses for forming an image thereon, a pair of spaced diffusion glasses positioned on the undersurface of said screen glass with a slit defined between the opposing faces of the diffusion glasses, photosensitive cells positioned on the undersurface of said diffusion glasses as sensor means for said vertical rotary shaft, optical fibers having one ends received in said slit leaving a clearance between the ends of the fibers and photosensitive cells secured to the other ends of said optical fibers as sensors for said horizontal rotary shafts, whereby said sensors control the vertical and horizontal rotary shafts to always align the optical axis of the reflector with the optical axis of the sunlight.

2. A sun following-up device for a solar heat utilization apparatus having a framework, a sunlight reflector rotatably supported on said framework, a pair of horizontal rotary shafts rotatably supporting said reflector on said framework and a vertical rotary shaft extending through the center of said reflector, said sun following-up device comprising a fish eye lens unit having the optical axis parallel to the optical axis of said reflector, a series of vertically spaced lenses positioned below said fish eye lens unit, a screen glass positioned below said series of lenses for forming an image thereon, a pair of spaced diffusion glasses positioned on the undersurface of said screen glass with a slit defined between the opposing faces of the diffusion glasses, photosensitive cells positioned on the undersurface of said diffusion glasses as sensors for said vertical rotary shaft, optical fibers having one ends received in said slit leaving a clearance between the ends and photosensitive cells secured to the other ends of said optical fibers as sensors for said horizontal rotary shafts, whereby said sensors control said vertical and horizontal rotary shafts to always align the optical axis of said reflector with the optical axis of the sunlight and when the time period during which the quantity of the sunlight is less than a predetermined value is longer than a predetermined time length and/or the wind velocity is in excess of a predetermined value, the optical axis of the reflector is orientated vertically and the reflector is maintained in the position in which the optical axis of the reflector is orientated vertically for a predetermined time period after the orientation of the optical axis of the reflector to the vertical.

* * * * *